United States Patent [19]
Calderwood

[11] Patent Number: 4,888,836
[45] Date of Patent: Dec. 26, 1989

[54] LIGHTER-THAN-AIR-FURNITURE

[76] Inventor: William A. Calderwood, 13660 N. 94th Dr., Peoria, Ariz. 85345

[21] Appl. No.: 335,896

[22] Filed: Apr. 10, 1989

[51] Int. Cl.[4] ............................................. A47C 27/08
[52] U.S. Cl. ........................................ 5/10 B; 5/449; 244/31; 40/214; 446/220; 297/DIG. 3
[58] Field of Search ..................... 5/10, 11, 9 R, 9 B, 5/449; 244/33, 31; 40/212, 214; 446/220, 226; 108/149; 297/3, DIG. 3

[56] References Cited

U.S. PATENT DOCUMENTS

| | | | |
|---|---|---|---|
| 662,089 | 11/1900 | Pettey | 5/10 |
| 1,197,035 | 9/1916 | Knudtson et al. | |
| 1,301,186 | 4/1919 | Sorlien et al. | |
| 1,617,011 | 2/1927 | Cooper | |
| 1,819,516 | 8/1931 | Kelly | 5/10 |
| 1,924,236 | 9/1931 | Friedberg | 244/31 |
| 2,437,602 | 3/1948 | Hahn | 155/179 |
| 2,626,432 | 1/1953 | Williams | 5/10 |
| 2,960,298 | 11/1960 | Jones | 244/153 |
| 2,987,735 | 6/1961 | Nail | 5/348 |
| 3,166,799 | 1/1965 | Birnkrant | 5/453 |
| 3,623,168 | 8/1970 | Rouch | 5/10 |
| 3,635,528 | 1/1972 | Strom | 297/456 |
| 3,829,912 | 8/1974 | Quakenbrush | 5/10 |
| 3,839,631 | 10/1974 | Goddard | 244/33 |
| 3,899,797 | 8/1975 | Gunst | 5/350 |
| 4,169,295 | 10/1979 | Darling | 5/450 |
| 4,281,873 | 8/1981 | Holland | 297/118 |
| 4,594,743 | 6/1986 | Owen | 5/449 |
| 4,722,498 | 2/1988 | Cameron | 244/153 |

Primary Examiner—Alexander Grosz
Assistant Examiner—F. Saether
Attorney, Agent, or Firm—Don J. Flickinger; Jordan M. Meschkow; Lowell W. Gresham

[57] ABSTRACT

Furniture which resides in one of a levitated position and a sunk position is disclosed. The furniture includes a bladder which is shaped to remain stable when placed on a floor and which is shaped to support a body. The bladder contains a lighter-than-air gaseous substance, such as helium, confined therein. The gaseous substance operates in conjunction with the bladder to define the furniture shape. The bladder is dimensioned to contain a sufficient quantity of the gaseous substance so that buoyancy in the atmosphere causes it to rise to a ceiling of a room when the furniture is out of use. The furniture additionally includes a tether attached to a bottom surface thereof. The furniture is moved from a levitated, out-of-use, position to a sunk, in-use, position by grasping the tether and pulling the furniture downward from the ceiling. The furniture may then be maintained in the sunk position, wherein it rests on a floor of the room, by using the furniture in a conventional manner to support a body.

20 Claims, 1 Drawing Sheet

LIGHTER-THAN-AIR-FURNITURE

TECHNICAL FIELD OF THE INVENTION

The present invention relates generally to furniture. More specifically, the present invention relates to furniture which is specifically adapted to levitate when not in use.

BACKGROUND OF THE INVENTION

Numerous examples of furniture and like articles intended to support a human body in various positions above a floor or supporting surface are known. Conventional beds, chairs, stools, and the like are examples. While conventional furniture acceptably achieves this supporting function, it suffers from a serious drawback when it is not providing the above-mentioned supporting function. Specifically, many situations require the use of furniture in confined areas. Thus, when the furniture is not in use, it wastes a scarce resource of floor space.

In an attempt to address the problem of preserving floor space when, for example, a bed is not in use, prior art devices utilize receiving structures located in a ceiling or wall. In order to use such a bed, the bed pivots or is otherwise lowered from its receiving structure to the floor. When such a bed is not being used, it pivots or is otherwise raised into its receiving structure so that the floor space previously occupied by the bed may then be used for other purposes. Thus, such receiving structure and bed systems permit the dual use of the scarce resource of floor space.

While such receiving structure and bed systems may generally operate to achieve the dual use of floor space, they are often viewed by their users as being an unacceptable solution to the floor space problem. For example, such receiving structure and bed systems tend to be undesirably expensive. Moreover, a receiving structure of such a system tends to be so massive that it must firmly and structurally attach to a wall or ceiling to prevent compromising a user's safety. Furthermore, when such a receiving structure structurally attaches to a wall or ceiling, it becomes a fixture of the building in which it is used. Thus, such a receiving structure and bed system is installed only at great expense and trouble. And, once installed, it often cannot be removed when the building occupants leave the premises. Accordingly, the overall expense is so great that such systems fail to provide a viable solution to floor space problems.

Inflatable furniture provides a relatively inexpensive furniture option. However, conventional inflatable furniture fails to provide an adequate solution to the floor space problem. Specifically, in order to provide increased floor space inflatable furniture must be deflated and stored when not in use. Subsequently, such inflatable furniture must be re-inflated before it can be used again. This deflation and re-inflation process consumes such a large amount of time when implemented on a daily schedule that the use of inflatable furniture fails to provide a workable solution to floor space problems. Moreover, such inflatable furniture often requires the use of an air blowing apparatus for inflation. Such apparatus represents an unwanted expense and provides yet another storage problem.

In addition, items which tend to levitate, such as lighter-than-air balloons, are known. Such items may be filled with a lighter-than-air gas, such as hot air or helium, so that buoyancy within the atmosphere tends to cause levitation. However, such conventional items fail to exhibit characteristics which allow them to successfully operate as furniture. Consequently, such items fail to provide any solution to the floor space problem.

SUMMARY OF THE INVENTION

Accordingly, it is a advantage of the present invention that furniture which permits the dual use of floor space is provided.

Another advantage is that the present invention is relatively inexpensive to acquire and to use safely.

Yet another advantage is that the present invention may be moved between in-use and out-of-use positions in a minimum amount of time and through the exertion of a minimum amount of effort on the part of the furniture user.

Still another advantage is that the present invention provides furniture which tends to levitate when not in use.

Yet another advantage is that the present invention provides both an improvement in furniture which is adapted to permit the dual use of floor space and an improvement in levitating items.

The above and other advantages of the present invention are carried out in one form by an article of furniture which supports a body while the article is in a sunk, in-use, position and which may be selectively positioned by a furniture user in either the sunk position or in a levitated, out-of-use, position. The article includes a bladder which has a top surface that is configured to support a body and a bottom surface that is configured to support the article and body in a stable orientation on a generally horizontal surface. In addition, the article includes a tether, coupled to the bottom surface of the bladder, for moving the article from the levitated position to the sunk position.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
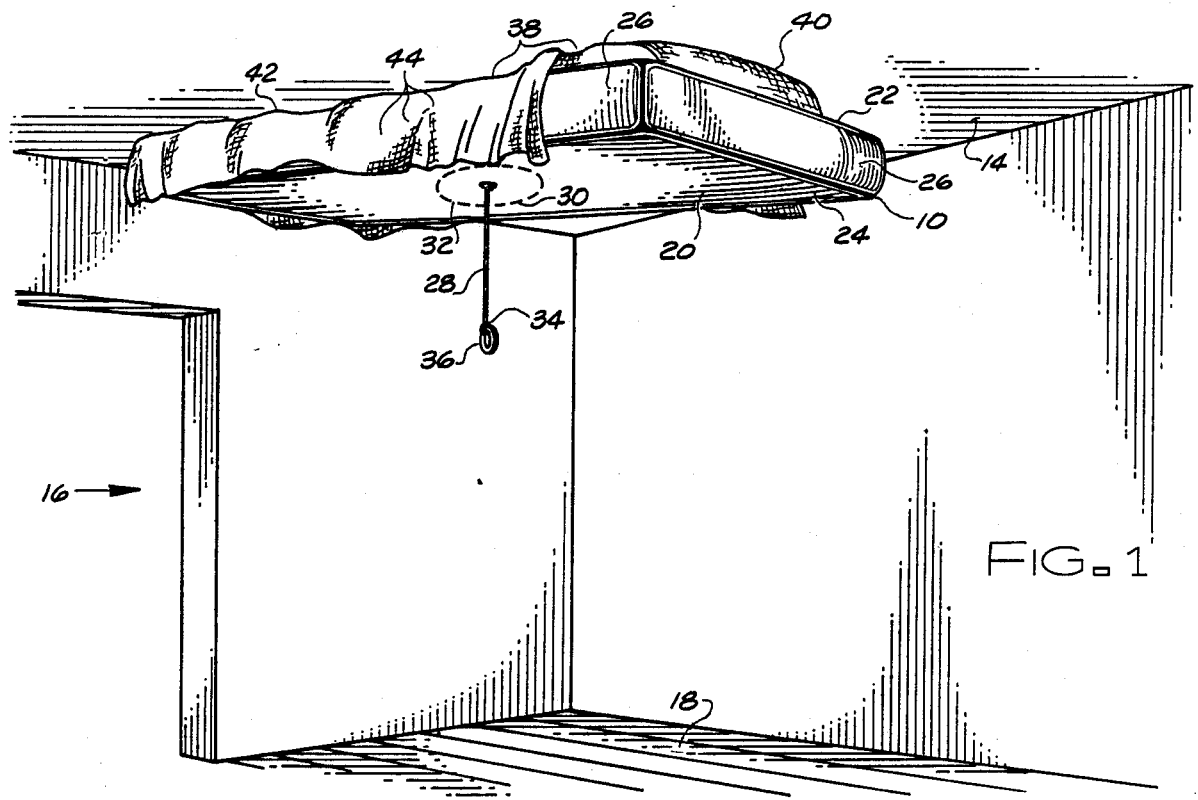
FIG. 1 shows a perspective view of the present invention in a levitated position.
Figure 2:
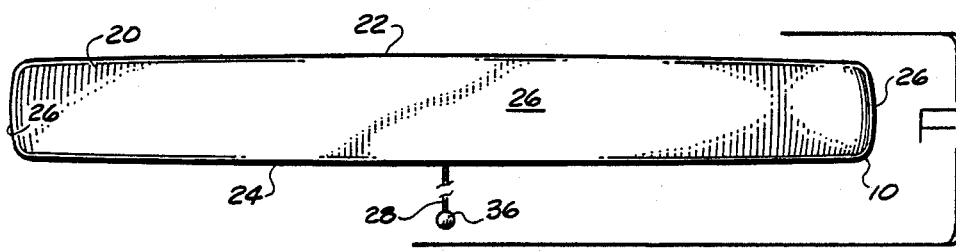
FIG. 2 shows a side view of the present invention.
Figure 3:
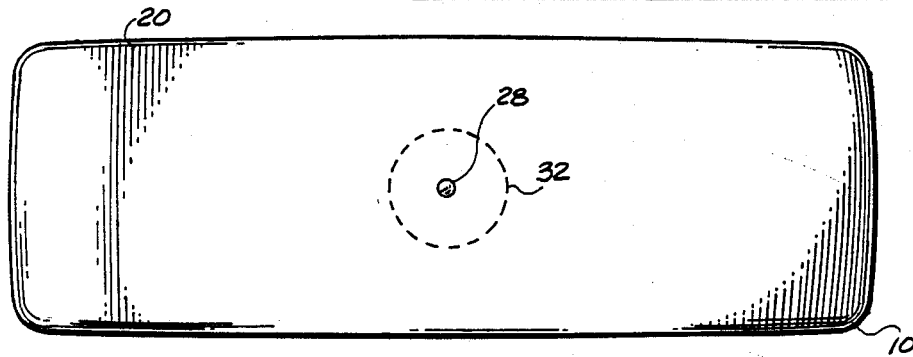
FIG. 3 shows a bottom view of the present invention.
Figure 4:
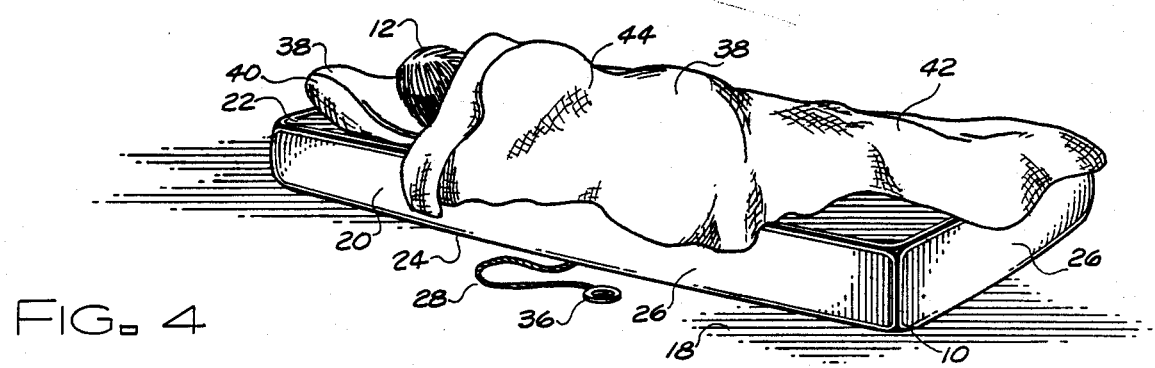
FIG. 4 shows a perspective view of the present invention in a sunk position.

Generally speaking, the present invention represents an article of furniture 10, such as a mattress, chair, or the like, which is depicted in each of FIGS. 1-4 and which operates in two modes. FIG. 1 illustrates an out-of-use mode, which occurs when article 10 is not being used to support a body 12 (see FIG. 4). In this out-of-use mode, article 10 resides in a levitated position in which article 10 is positioned directly underneath a ceiling 14 of a room 16 in which it resides. On the other hand, FIG. 4 illustrates an in-use mode, which occurs when article 10 is being used to support body 12. In this in-use mode, article 10 resides in a sunk position in which article 10 rests in a stable orientation on a floor 18 of room 16.

With reference to each of FIGS. 1-4, article 10 includes a bladder 20. In the embodiment depicted by the FIGURES, bladder 20 takes the shape of a hollow, three-dimensional rectangle. In other words, bladder 20 includes a top wall 22 spaced apart from a bottom wall 24 and residing generally parallel to bottom wall 24. Perimetric side walls 26 join top and bottom walls 22 and 24 along the perimeters thereof. Accordingly, when resting on floor 18, bottom wall 24 is sufficiently flat so that it tends to remain in position without significant rolling or wobbling. Likewise, when article 10 rests on floor 18, top wall 22 is spaced above floor 18 and resides in a generally horizontal orientation. Thus, top wall 22 is configured to support body 12 in a reclined position without tending to promote movement of body 12 off of top wall 22. Accordingly, article 10 as depicted in the FIGURES operates as a mattress.

In addition, bladder 20 includes a valve (not shown) which permits the introduction of a gaseous substance into the hollow interior of bladder 20 and which, in connection with walls 22-26, entraps or confines the gaseous substance within bladder 20. The gaseous substance in conjunction with bladder 20 defines the general shape of bladder 20. The present invention contemplates the use of conventional techniques to control the shape of bladder 20 when the gaseous substance is confined therein. Of course, those skilled in the art will recognize that each of walls 22-26 may bow outward under the pressure of the gaseous substance confined within bladder 20.

The gaseous substance utilized in the present invention exhibits a density which is significantly less than the density of air. Consequently, buoyancy in the atmosphere causes article 10 to naturally rise to its levitated position, as illustrated by FIG. 1, when article 10 is not weighted down. In the preferred embodiment, this gaseous substance includes a substantial quantity of helium, which exhibits an atomic weight approximately 27% of the atomic weight of air. Moreover, helium represents a relatively safe substance, which is therefore suitable for household use.

The material of bladder 20 is substantially impervious to this gaseous substance. In other words, the gaseous substance remains confined within bladder 20 over long periods of time when article 10 is used in a conventional manner to support body 12. The present invention contemplates the use of a strong, lightweight plastic film, such as a thin Mylar ®, having seams formed in a conventional manner so that such seams exhibit sufficient strength to accommodate the conventional use of article 10.

Article 10 additionally includes a tether 28. Tether 28 has a first end 30 which attaches to a central area 32 of the exterior of bottom wall 24 of bladder 20. Tether 28 additionally has a second end 34 which, in the preferred embodiment of the present invention, attaches to a weight 36. The FIGURES illustrate tether 28 as being a string-like structure. However, other flexible members, such as a strip of plastic film, may also serve as tether 28.

Tether 28 is preferably as short as possible in length to reduce the overall mass of article 10 and increase buoyancy. Nevertheless, tether 28 is sufficiently long so that it may be reached by a person standing on floor 18 when article 10 is in its levitated position (see FIG. 1). Likewise, weight 36 represents an optional component of article 10 which is preferably as light as possible to improve buoyancy. However, weight 36 in the preferred embodiment is sufficiently heavy so that tether 28 tends to hang downward when article 10 is in its levitated position and can be easily grasped.

In the preferred embodiment, article 10 additionally includes bedclothes 38. The FIGURES illustrate bedclothes 38 overlying top wall 22 of bladder 20. Bedclothes 38 include a pillow 40 and a covering 42. In the preferred embodiment, lightweight materials are used in the construction of bedclothes 38 to improve buoyancy. Pillow 40 may, for example, represent a conventional inflatable pillow, and covering 42 may, for example, include a plastic sheet having entrapped air pockets 44 therein. However, those skilled in the art will recognize that the present invention is not limited to such bedclothes and that sleeping bags or other conventional bedclothes are contemplated as well.

As discussed above, buoyancy causes article 10 to rise to its levitated position. In other words, the total mass of all components which are included in article 10 is less that the mass of that quantity of air which occupies the same volume of space as is occupied by such components. Since, in the preferred embodiment of the present invention, only the gaseous substance exhibits a density less than the density of air, the quantity of such gaseous substance contained within bladder 20 is sufficiently great to compensate for the relatively higher density bladder 20, tether 28, weight 36, and bedclothes 38. In addition, the altitude, temperature, and humidity at which article 10 is used affects the density of air. Consequently, bladder 10 is appropriately dimensioned so that a sufficient quantity of the gaseous substance is contained within bladder 20 to permit levitation under the atmospheric conditions in which article 10 is used.

Of course, those skilled in the art will recognize that alternate embodiments of the present invention may omit bedclothes 38 and/or weight 36. In such alternate embodiments, bladder 20 may exhibit smaller dimensions because in such alternate embodiments article 10 does not need to include that quantity of the gaseous substance which compensates for the density of bedclothes 38 and weight 36.

A person who wishes to use article 10 in a conventional furniture-like manner grasps tether 28 and pulls article 10 downward, toward floor 18. By utilizing article 10 to support the person (see body 12 in FIG. 4), the person in combination with article 10 together exhibit a density greater than the density of air, and the buoyancy effect is then reversed. Consequently, article 10 sinks in the atmosphere until it rests on floor 18. When article 10 is in its sunk position, illustrated by FIG. 4, tether 28 no longer hangs downward but resides substantially horizontal so that it too rests on floor 18. Consequently, article 10 remains stably positioned on floor 18. When body 12 moves away from article 10, article 10 then rises to its levitated position without any effort on the part of its user.

In summary, the present invention provides furniture which permits use of floor space both for the furniture, when the furniture is in-use, and for other purposes when the furniture is out-of-use. The furniture of the present invention utilizes relatively inexpensive materials and requires no modification of a room in which it is used. Consequently, the furniture of the present invention is relatively inexpensive to acquire and to use safely. The furniture may be moved into its sunk position simply by pulling on a tether and to its levitated position simply by moving away from it. Thus, the present invention may be moved between in-use and out-of-use positions in a minimum amount of time and through the exertion of a minimum amount of effort on the part of its user.

The present invention has been described above with reference to a preferred embodiment. However, those skilled in the art will recognize that changes and modifications may be made in this preferred embodiment without departing from the scope of the present invention. For example, although the FIGURES depict bladder 20 as being a rectangular mattress, the present invention contemplates the use of a wide variety of shapes, including, but not limited to, shapes which function as a chair or stool. These and other changes and modifications which are obvious to those skilled in the art are intended to be included within the scope of the present invention.

What is claimed is:

1. An article of furniture for support of a body while said article is in a sunk position and for being selectively positioned in one of said sunk position and a levitated position, said article comprising:
   a bladder having a top surface configured to support said body and having a bottom surface configured for stable placement on a generally horizontal surface; and
   a tether coupled to said bottom surface of said bladder, said tether being for moving said article from said levitated position to said sunk position, said bladder maintaining substantially the same configuration in its levitated position as in its sunk position, said levitated position being obtained with the aid of a low density substance.

2. An article of furniture as claimed in claim 1 wherein said bladder is configured to confine and to be substantially impervious to a gaseous substance.

3. An article of furniture as claimed in claim 1 additionally comprising a gaseous substance exhibiting a density less than the density of air, said substance being confined within said bladder.

4. An article of furniture as claimed in claim 3 wherein said gaseous substance comprises helium.

5. An article of furniture as claimed in claim 3 wherein said gaseous substance consists essentially of helium.

6. An article of furniture as claimed in claim 3 wherein said bladder, tether, and gaseous substance together occupy a predetermined volume of space and said bladder, tether, and gaseous substance are collectively configured to exhibit a mass less than the mass of a volume of air which is equivalent to said predetermined volume.

7. An article of furniture as claimed in claim 1 wherein said bladder is configured to operate as a mattress.

8. An article of furniture as claimed in claim 7 wherein:
   said article additionally comprises a gaseous substance confined within said bladder; and
   said bladder comprises:
      a top wall having an outer surface which serves as said top surface,
      a bottom wall positioned substantially parallel to said top wall and having an outer surface which serves as said bottom surface, and
      a perimetric side wall extending between said top and bottom walls and operating in conjunction with said top and bottom walls to confine said gaseous substance within said bladder.

9. An article of furniture as claimed in claim 1 wherein said tether has first and second ends, and said tether first end attaches to a central portion of said bottom surface.

10. An article of furniture as claimed in claim 9 additionally comprising a weight attached to said second end of said tether.

11. An article of furniture a claimed in claim 9 wherein said tether is configured to extend downward when said article is in said levitated position and to extend substantially horizontal when said article is in said sunk position.

12. A mattress for support of a body while said mattress is in a sunk position and for being selectively positioned in one of said sunk position and a levitated position, said mattress comprising:
   a bladder having a top surface configured to support said body and having a bottom surface configured for stable placement on a generally horizontal surface;
   a gaseous substance exhibiting a density less than the density of air, said substance being confined within said bladder; and
   a tether coupled to said bottom surface of said bladder, said tether being for moving said mattress from said levitated position to said sunk position.

13. A mattress as claimed in claim 12 additionally comprising bedclothes positioned on said top surface of said bladder.

14. A mattress as claimed in claim 13 wherein said bladder, tether, gaseous substance, and bedclothes together occupy a predetermined volume of space and said bladder, tether, gaseous substance, and bedclothes are collectively configured to exhibit a mass less than the mass of a volume of air which is equivalent to said predetermined volume.

15. A mattress as claimed in claim 13 wherein said gaseous substance consists essentially of helium.

16. A mattress as claimed in claim 13 wherein said bladder comprises:
   a top wall having an outer surface which serves as said top surface;
   a bottom wall positioned substantially parallel to said top wall and having an outer surface which serves as said bottom surface; and
   a perimetric side wall extending between said top and bottom walls and operating in conjunction with said top and bottom walls to confine said gaseous substance within said bladder.

17. A mattress as claimed in claim 16 wherein said tether has first and second ends, and said tether first end attaches to a central portion of said bottom wall.

18. A mattress as claimed in claim 17 additionally comprising a weight attached to said second end of said tether.

19. A mattress as claimed in claim 18 wherein said tether is configured to extend downward when said mattress is in said levitated position and to extend substantially horizontal when said mattress is in said sunk position.

20. An article of furniture for support of a body while said article is in a sunk position and for being selectively positioned in one of said sunk position and a levitated position, said article comprising:
   a bladder comprising:
      a top wall configured to support said body,
      a bottom wall positioned substantially parallel to said top wall, and a perimetric side wall extending between said top and bottom walls;
a gaseous substance consisting essentially of helium, said gaseous substance being confined within said top, bottom, and side walls of said bladder; and
a tether coupled to a central area of said bottom wall of said bladder, said tether being for moving said article from said levitated position to said sunk position, and said tether being configured to extend downward when said article is in said levitated position and to extend substantially horizontal when said article is in said sunk position;
wherein said bladder, gaseous substance, and tether together occupy a predetermined volume of space and said bladder, gaseous substance, and tether are collectively configured to exhibit a mass less than the mass of a volume of air which is equivalent to said predetermined volume.

* * * * *